US012724950B1

(12) United States Patent
Padukka Vidanelage Thanuja et al.

(10) Patent No.: US 12,724,950 B1
(45) Date of Patent: Sep. 1, 2026

(54) AUTOMATIC WAIVER GENERATION FOR FILTERING VIOLATIONS REPORTED BY STATIC ANALYSIS

(71) Applicant: Synopsys, Inc., Mountain View, CA (US)

(72) Inventors: Madusanka Padukka Vidanelage Thanuja, Colombo (LK); Zamrath Mohamed Nizam Mohamed, Galle (LK); Himanshu Kathuria, Fremont, CA (US); Mohan Mangal, Fremont, CA (US); Rohit Kumar Ohlayan, New Delhi (IN)

(73) Assignee: Synopsys, Inc., Sunnyvale, CA (US)

( * ) Notice: Subject to any disclaimer, the term of this patent is extended or adjusted under 35 U.S.C. 154(b) by 795 days.

(21) Appl. No.: 18/175,880

(22) Filed: Feb. 28, 2023

Related U.S. Application Data

(60) Provisional application No. 63/315,951, filed on Mar. 2, 2022.

(51) Int. Cl.
*G06F 30/30* (2020.01)
*G06F 30/33* (2020.01)
*G06F 119/12* (2020.01)

(52) U.S. Cl.
CPC .......... *G06F 30/33* (2020.01); *G06F 2119/12* (2020.01)

(58) Field of Classification Search
USPC ......................... 716/101, 104, 106, 107, 108
See application file for complete search history.

(56) References Cited

U.S. PATENT DOCUMENTS

2005/0246673 A1* 11/2005 Charlebois .......... G06F 30/3312 716/108
2015/0149837 A1* 5/2015 Alonso ................. H04W 4/029 714/57
2016/0259879 A1* 9/2016 Ganai ................... G06F 30/398
2020/0372124 A1* 11/2020 Ting ......................... G06N 3/09

OTHER PUBLICATIONS

Xilinx "Vivado Design Suite User Guide, Design Analysis and Closure Techniques", Oct. 27, 2021 (Year: 2021).*

* cited by examiner

*Primary Examiner* — Brian Ngo
(74) *Attorney, Agent, or Firm* — Fenwick & West LLP

(57) ABSTRACT

A design database contains register transfer level (RTL) code for a design, and a violations database contains violations generated by a static analysis of the RTL code. The violations are tagged to code snippets of the RTL code. A machine learning model executes on a processing device. The machine learning model generates recommendations for waivers of the violations, based on the violations and the corresponding tagged code snippets in the databases.

20 Claims, 6 Drawing Sheets

AUTOMATIC WAIVER GENERATION FOR FILTERING VIOLATIONS REPORTED BY STATIC ANALYSIS

RELATED APPLICATION

This application claims priority under 35 U.S.C. § 119 (e) to U.S. Provisional Patent Application Ser. No. 63/315,951, "Automatic Waiver Generation for Filtering Violations Reported by Static Analysis of a Circuit Design," filed Mar. 2, 2022. The subject matter of all of the foregoing is incorporated herein by reference in its entirety.

TECHNICAL FIELD

The present disclosure relates to static analysis of electronic circuit and system designs in general and more specifically to automatic waiver generation for filtering violations reported by static analysis.

BACKGROUND

Static code analysis, such as linting, is used to detect errors in circuit designs described by a high-level specification such as a register transfer level (RTL) specification. These errors may relate to common coding mistakes, styles, naming, security issues, etc. The static analysis helps to improve the overall quality of the RTL code. However, systems that automate static analysis can be noisy due to limitations in static analysis techniques. These automated systems may report violations that are not actually violations or that are otherwise not of interest to the designer. Circuit designers may use waiver commands to mark violations that the designer wishes to ignore. However, static analysis of a circuit design can produce a large volume of violations, leading to a correspondingly large volume of waivers.

SUMMARY

In some aspects, a design database contains register transfer level (RTL) code for a circuit or other system design, and a violations database contains violations generated by a static analysis of the RTL code. The violations are tagged to code snippets of the RTL code. A machine learning model executes on a processing device. The machine learning model generates recommendations for waivers of the violations, based on the violations and the corresponding tagged code snippets.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
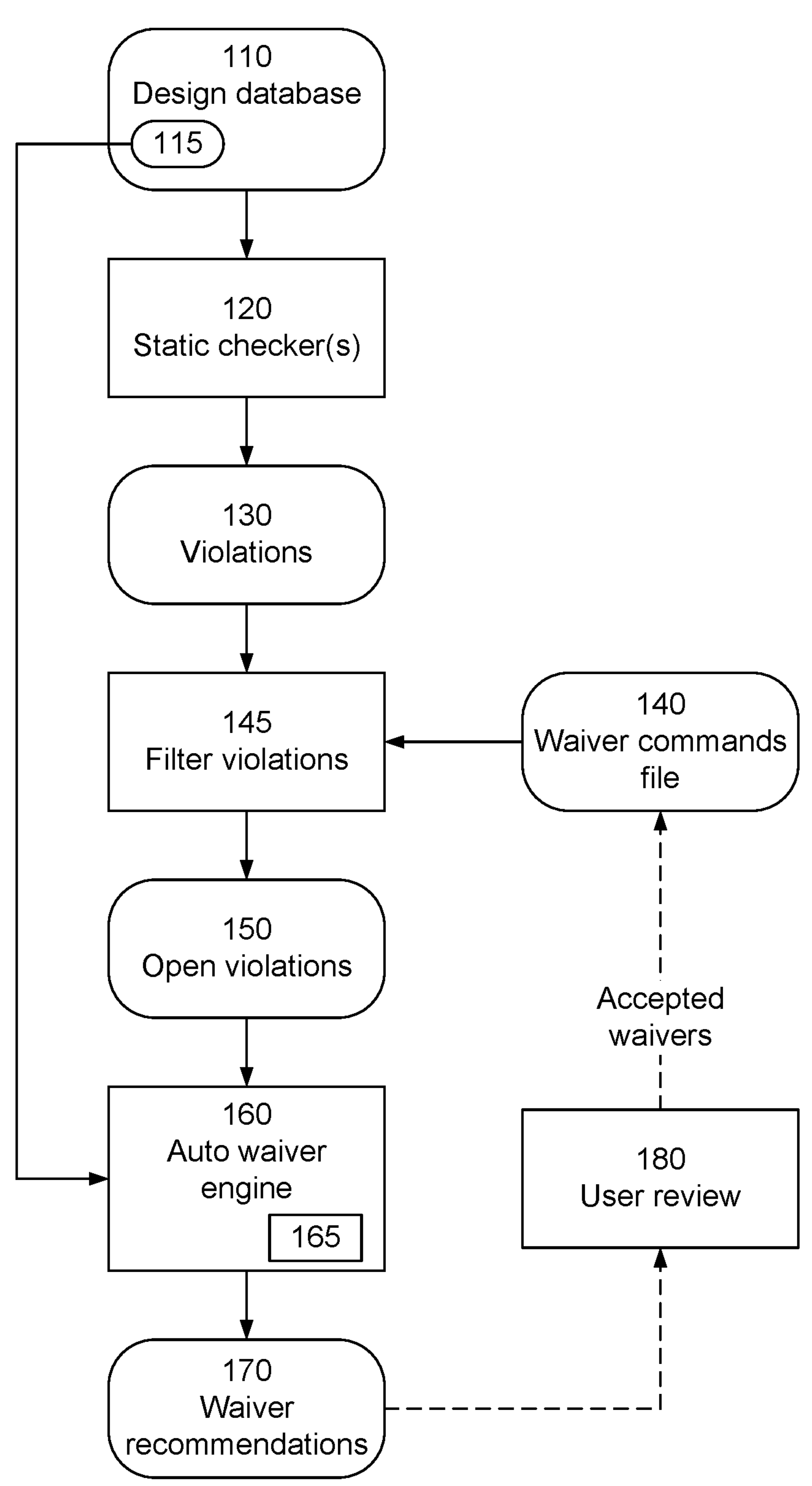
FIG. 1 is a flowchart for automatic waiver recommendation according to embodiments of the present disclosure.

Aspects of the present disclosure relate to automatic waiver generation for filtering violations reported by static analysis of a circuit or system design. Due to increases in the complexity of designs, the register transfer level (RTL) representations of circuit and other system designs are also becoming larger and more complex, containing many more lines of RTL code. As a result, systems that perform static analysis of these designs, for example linters, may report a large number of violations, some of which may not be real violations (false positives) or which the designer wants to ignore for other reasons.

Static code checkers support the use of waivers to filter out violations that do not need to be corrected. The waivers are specified in waiver commands. The waiver command may define a pattern that occurs in a violation. When violations reported by the static analysis match the pattern in the waiver command, then those violations are filtered out. This reduces the amount of noise in the violations report.

However, waivers may be defined manually. This requires a designer to manually review all of the reported violations, manually identify which violations should be waived, and then manually write the corresponding waiver commands. However, as circuit and system designs increase in size and complexity, the corresponding RTL code base also increases in size and complexity. The static analysis generates a correspondingly larger number of violations and a larger number of waivable violations. The effort required to generate all of the waiver commands manually may become excessive.

In some aspects, a system (an automated waiver engine) automatically recommends waivers for violations generated by static analysis. The waiver engine uses a machine learning model to recommend waivers for a design. The machine learning model may be trained based on various features, including (1) features describing violations reported by the static analysis, (2) features describing snippets of the RTL code tagged to the violations, and (3) features describing known waivers and/or non-waivers of previously considered violations. That is, the training set includes samples of previously considered violations, corresponding RTL code snippets, and waiver status and information for those violations. The machine learning model may be a supervised learning model that uses nearest neighbor techniques.

Once trained, the machine learning model predicts whether violations for a current design should be waived. The waiver recommendations may be provided to a user for approval before being incorporated into the design process. For approved recommendations, the waiver engine may generate the corresponding waiver commands and include them into the relevant design files. Various other actions may then be taken, as described below.

Technical advantages of the present disclosure include, but are not limited to, the following. The assistance provided by an automated waiver engine can reduce the time required to identify waivers and generate the corresponding waiver commands for a design. It can also reduce errors that may occur in a manual identification and drafting of waiver commands. The use of machine learning models can leverage patterns discovered in a static analysis of a circuit or system design for re-use in later static analyses of the same design or even in other designs. Machine learning models are also capable of discovering patterns of related waivers that may not be apparent to a human user.

Figure 6:
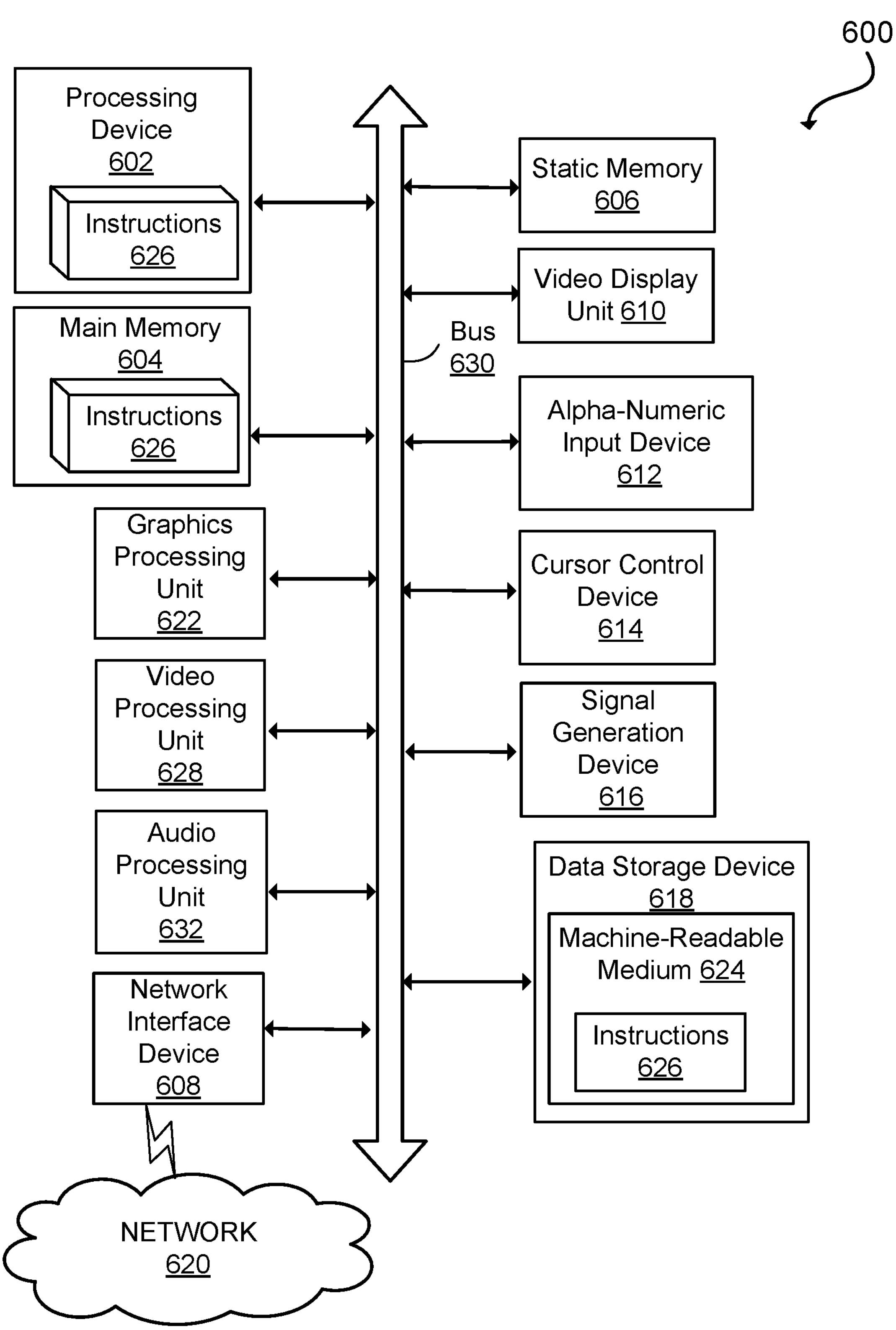
FIG. 6 depicts a diagram of an example computer system in which embodiments of the present disclosure may operate.

FIG. 1 is a flowchart for automatic waiver recommendation according to embodiments of the present disclosure. The processes in FIG. 1 may be executed by a processing device, such as shown in FIG. 6. The following examples consider circuit designs but other designs, such as system designs, may also be used. A circuit design is described in a design database 110 that includes RTL code 115 describing the functionality of the circuit design. As part of the design process, static checker(s) 120, such as linters, perform static code analysis to verify the functionality of the RTL code 115.

Static code analysis scans through the existing design (e.g. line of RTL code) and identifies locations where common and/or best practices may be violated. For an example, a left out terminal in instantiations may be considered to be a problem, and static code analysis can analyze RTL code to identify locations where this occurs. Other problems that can identified by static code analysis include width mismatch between lefthand side and righthand side expression of an assignment, variables which are used but not assigned an initial value, mismatch in comparison of signed and unsigned variables, and combinational loops.

Possible problems identified by the static checker 120 are reported as violations 130. The violations 130 are tagged to the sections of the RTL code 115 (code snippets) that produced the violation. For example, each violation may be tagged with a file name and line number(s) to identify the corresponding RTL code snippet.

A user may not want to consider all of the reported violations 130. At 145, waivers 140 may be applied to filter out certain violations 130. The waivers are expressed as waiver commands. Different types of waiver commands may use different criteria to identify which violations are to be waived. For example, some waiver commands may waive all violations in a specified IP block or module. Violations typically are given tag names, and some waiver commands may waive violations with a specified tag name. Some waiver commands may waive violations which are reported for a specified location in the RTL code, such as for a specific file and/or line. The waiver commands may be specified in a file, such as the waiver commands file 140 of FIG. 1. In the flow of FIG. 1, the system reads the waiver commands 140 and filters out (at 145) matching violations, producing a database 150 of the remaining unfiltered violations. For convenience, these violations may be referred to as open violations.

Waivers helps designers to analyze and address static code violations. False positives or otherwise acceptable violations do not need to be corrected in the RTL code. Waivers are used to filter out these violations so that they do not clutter the report of violations. Some violations are indications of actual problems in the RTL code. These may be addressed by correcting the underlying RTL code. During the design process, the designer runs the static check multiple times as the design progresses. As waiver commands are added to remove waivable violations and as actionable violations are resolved in the RTL code, the number of reported violations decreases.

In FIG. 1, an automated waiver engine 160 generates recommendations 170 for waivers, based on the open violations in database 150 and the corresponding RTL code snippets 115. The waiver engine 160 iterates through the violations and classifies the violations, either individually or in groups. The waiver engine 160 includes a machine learning model 165, which classifies violations as "waivable" or "not waivable." For example, the machine learning model may be a binary classifier that returns true if a violation is waivable (i.e., violation can be waived) and false if the violation is not waivable (i.e., violation cannot be waived). In some cases, the waiver engine 160 may also generate a confidence level score for the recommendation. For example, the machine learning model 165 may produce a confidence level score within a range of possible values, where the confidence level score indicates on a sliding scale whether a violation is waivable.

The machine learning model 165 is trained based on known or available samples of violations, the corresponding RTL code snippets, and the waiver information applicable to the violation. The waiver information may include whether or not the violation is waived, and the type of waiver or waiver command if the violation is waived. These training samples may come from waiver decisions for previously considered violations in the design of the circuit. Training samples may also come from static analysis of other circuits.

Various actions may be taken based on the recommendations 170. In FIG. 1, the waiver recommendations are presented to a user 180, who decides whether to accept or reject the recommendation. The recommendations may be presented in a user interface, where the user makes a selection to accept or reject a waiver recommendation. Alternatively, the recommendations may be output to a report, which the user reviews. For accepted recommendations, the waiver engine may automatically generate the corresponding waiver commands and add them to the current set of waivers 140 so they can be applied to the next iteration of static check. The user's decisions whether to accept or reject recommended waivers may also be used as feedback to improve the waiver engine 160's recommendations.

Figure 2:
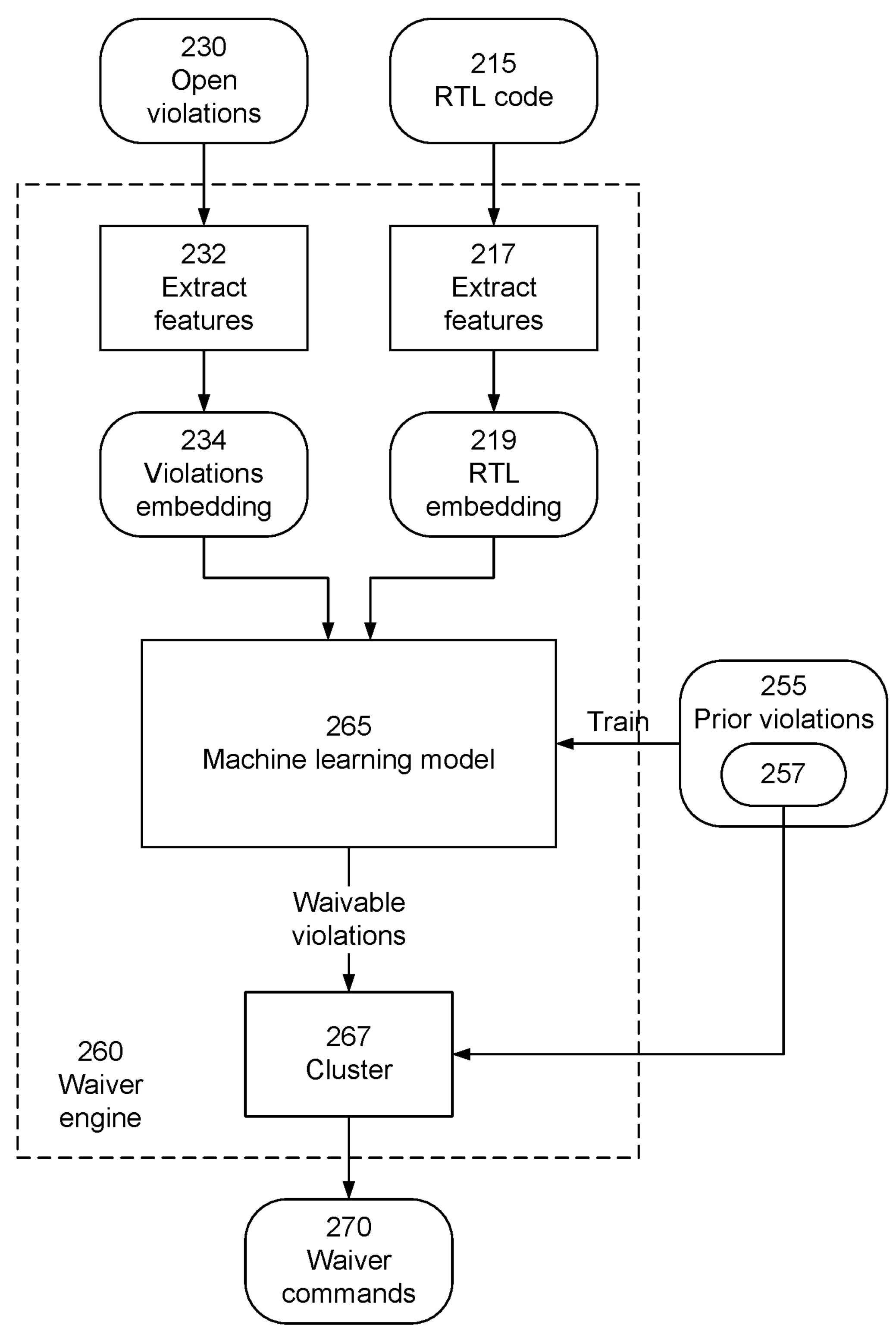
FIG. 2 is a diagram of an automated waiver engine according to embodiments of the present disclosure.

FIG. 2 is a block diagram of a waiver engine according to embodiments of the present disclosure. The waiver engine 260 may be implemented by a processing device, such as shown in FIG. 6. The machine learning model 265 may be implemented by specialized hardware accelerators or GPUs. The waiver engine 260 considers the open (i.e., not waived) violations 230 reported by the static analysis and recommends waiver commands 270 for those violations. The waiver engine 260 includes a machine learning model 265 that is trained on patterns from previously considered violations, RTL code snippets and waivers in database 255. For convenience, the violations in database 255 will be referred to as prior violations, in contrast to the open violations 230. The database 255 may include violations 257 from the current design which have been previously considered and waived or not waived. The database 255 may also include violations from other circuit designs. As a result, the machine learning model 265 can recommend waivers for the open violations, based on the patterns learned from the prior violations and waiver decisions in database 255. The machine learning model 265 is trained using labelled data. In one approach, each prior violation is labeled as either waived or not waived. The labels may include additional information, such as the type of waiver, type of violation or the waiver command for waived violations.

To automatically recommend waiver commands 270 for open violations 230, the waiver engine identifies similar patterns between previously waived violations 255 and open violations 230. When analyzing similarity across violations, the waiver engine may determine that multiple false positive violations 230 are reported due to the same root cause in the RTL code. If the designer has already waived a violation 257 for that root cause in database 255, the waiver engine may suggest waivers for the open violations which are produced by the same root cause.

The following is an example where multiple violations are caused by an open port connection to an instance (deliberately open connections).

Listing 1: RTL Code Example with Open Port

```
module top input in, output out);
    sub inst (in, 1, out);
endmodule
module sub (input in1, in2, output out);
    assign out=in1 & in2;
endmodule
```

In RTL code listing 1 above, the in2 signal is not connected from the top hierarchy and this may be deliberately kept open. This RTL code can cause multiple violations for different static checks, such as those listed in Table 1:

TABLE 1

| Violations generated by open port | |
|---|---|
| Violation name | Violation message |
| PartConnPort | Port 'in2' is unconnected in instance 'inst' |
| RegInputOutput | Input port 'in2' is not registered |
| UndrivenInTerm | Detected undriven input terminal top.inst.in2 |

In some cases, these violations may be false positives. However, a designer will have to go through each violation in the error report and manually apply waivers to each violation. If a designer has applied a waiver to only some violations (e.g., to RegInputOutput), violations will still be reported for the remaining violations (PartConnPort, UndrivenInTerm). The waiver engine may generate waiver recommendation for these remaining open violations because they are tagged to similar RTL for previously waived violations.

Consider another example involving two different RTL code snippets located in different IP circuit blocks and files: IP1 and IP2 as shown in Listings 2A and 2B below. These RTL codes may have been developed by different designers in different organization.

Listing 2A: RTL Code Example IP1

```
module IP1 ( );
wire [3:0] A, B;
wire [3:0] C, D;
assign A={1'b0, C};
// W164a
assign D={1'b0, B);
// W164b
Endmodule
```

Listing 2B: RTL Code Example IP2

```
module IP2 ( );
wire [3:0] P, Q;
wire [3:0] R, S;
assign P={1'b0, R};
assign S={1'b0, Q};
endmodule
```

Static analysis of IP1 may generate the violations shown in Table 2.

TABLE 2

| Violations for RTL code IP1 | |
|---|---|
| Tag | Violation message |
| W164a | LHS: 'A' width 4 is less than RHS: '{1'b0, C}' width 5 in assignment [Hierarchy: ':IP1'] |
| W164b | LHS: 'D' width 4 is less than RHS: '{1'b0, B}' width 5 in assignment [Hierarchy: ':IP1'] |

A designer can apply waivers on these violations after doing the analysis of the RTL code in IP1. The RTL code in IP2 is similar to that in IP1, even though it may have been developed by a different designer in a different organization for a different flow. Static analysis may also generate violations for IP2 that are similar to the violations in Table 2 for IP1. However, these new violations in IP2 do not have waivers. The waiver engine can recommend waivers for IP2, based on the patterns learned from IP1.

The machine learning model 265 learns patterns in the RTL code, violations, and waivers for prior violations 255. The waiver engine 260 recommends new waivers 270 based on similar patterns identified in the open violations 230.

FIG. 2 shows an example implementation of the waiver engine 260. At 232, 217, the open violations 230 and corresponding RTL code snippets 215 are converted to respective embeddings 234, 219 by extracting relevant features, as described in more detail below. An embedding is a lower dimensional vector representation of feature data. These embeddings 234, 219 are used as inputs to the machine learning model 265. The machine learning model 265 classifies whether the violations are waivable.

At 267, the waivable violations are clustered based on their similarity. The waiver engine 265 generates waiver commands 270 for each cluster of waivable violations. Different types of waiver commands may be generated depending on the correlation between waivable violations in a cluster.

In one approach, the user can review the automatically generated waivers 270 in a graphical user interface. The user can analyze those waiver commands and decide to accept or reject the recommendation. The user interface includes links between the auto generated waivers 270 and previously accepted similar waivers 257, so that the user may review the previously accepted waivers. This can help the user to determine whether to accept the auto generated waiver commands 270. Based on the user's decision, the database of prior violations 255 and 257 may be updated.

Consider the violations embedding 232, 234. Listing 3 below shows an example of a violation generated by static analysis. The violation includes the fields Tag, Description, etc.

Listing 3: Example Violation

```
Tag: W164a
Description: LHS [NodeName]: '[LHSExpr]' width [LHS
    Size] is less . . .
Violation: Lint: 211
Goal: test goal
Module: sth counters
FileName: rtl/verilog/txcounters.v
LineNumber: 192
Statement: ByteCnt [15:0]<=ByteCnt [15:0]+16'd1;
```

NodeName:
LHSExpr: ByteCnt [15:0]
LHS Size: 16
RHSExpr: (ByteCnt [15:0]+16'dl)
RHS Size: 17
NodeType:
HIERARCHY: top.ethmac.macl.countersl With respect to feature extraction 232 for the violations, in some embodiments, the following fields are extracted as features: (1) Module/IP name where the violation is located, (2) File name (FN) where the violation is located, (3) Line number (LN) where the violation is located, and (4) the RTL statement tagged to the violation, as shown in Table 3 below. These features are about the location of the violation.

TABLE 3

Example features extracted for violations

| Violation ID | Module/IP | FA | LN | RTL Statement |
|---|---|---|---|---|
| 1 | counter | counter.v | 10 | assign a = b + c |
| 2 | nmux | vmux_rtl.v | 45 | data = adrs << 4 |
| 3 | dflop | dflop1.v | 54 | ctr <= var & num |

Accordingly, to achieve an embedding of RTL, a relative position is defined for every construct pattern. For example, if the 'module' construct from Verilog is represented using an enumerated (enum) value 4, and if an array having a length of 300 is created for all the possible Verilog constructs, then 'module' construct can be represented using index 4 in that array.

Listing 4 and Table 4 below illustrate an example of this type of embedding. In Listing 4, a violation is tagged to the RTL statement marked (A). The corresponding feature embedding is shown in Table 4.

Listing 4: Example RTL Code Snippet Tagged to a Violation

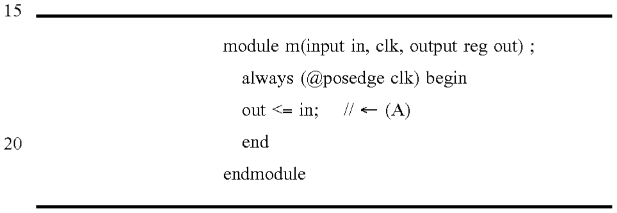

```
module m(input in, clk, output reg out) ;
  always (@posedge clk) begin
  out <= in;    // ← (A)
  end
endmodule
```

TABLE 4

Example feature embedding for RTL Listing 4

| Feature Index | 0 | . . . | 4 | . . . | 17 | . . . | 48 | . . . | 68 | . . . |
|---|---|---|---|---|---|---|---|---|---|---|
| Feature Name | . . . | . . . | Module | . . . | Port | . . . | Always | . . . | Named object | . . . |
| Value for Listing 4 | 0 | . . . | 1 | . . . | 0 | . . . | 1 | . . . | 1 | . . . |

The extracted features may also include information about the violation itself. These features from fields of the violation may be represented as a list of string values. Strings are labeled with unique identifier integer values. These integer values are used to define columns in a feature table, such as shown in Table 4 below. The feature value is set to logic 0 or 1 (row value) depending on the presence of a string label in a violation feature field.

Next consider the RTL embedding 219. Since violations are tagged to RTL code snippets, the waiver engine can also use features of the RTL code snippets to represent violations. For this, the waiver engine uses an embedding method which extracts features from the RTL. The waiver engine uses two types of features. (1) features based on relative position of the code snippet within the RTL code with respect to RTL constructs, and (2) features based on patterns within the RTL code snippet.

RTL supports different types of language constructs, for example, module, interface, package, always block, if blocks, for loops, blocking assignments, non-blocking assignments. The waiver engine lists different possible language constructs and labels them with unique integer values (referred to as enum value). The waiver engine reports violations tagged to specific RTL statements. The waiver engine retrieves that corresponding RTL statement for a violation, and creates an array of feature values corresponding to related RTL constructs. The feature value may be a binary value, where logic 1 indicates that the RTL construct is related to the tagged RTL statement and logic 0 indicates that the RTL construct is not related to the tagged RTL statement.

The features are embedded as follows. The violation is reported for RTL statement (A). Statement (A) is inside a module. The module construct is feature index 4 (e.g., element 4 in a vector), and the value is set to logic 1 since the module construct is present for RTL statement (A). The statement (A) is also within an always block, which is feature index 48, so that value is also set to logic 1. There are named objects in an assignment statement, which is feature index 68, and that value is set to logic 1.

For features based on patterns within an RTL statement, the waiver engine uses a list of different patterns. Each pattern is labeled with a unique integer value as the feature index. The waiver engine creates an array of features based on presence of these patterns (e.g., logic 1 indicates that the pattern is present, and logic 0 indicates that the pattern is not present). The waiver engine may perform pattern detection based on an RTL object model that represents RTL constructs and interconnections.

Listing 5 and Table 5 give an example. In Listing 5, a violation is tagged to the RTL statement marked (A). The corresponding feature embedding is shown in Table 5.

Listing 5: Example RTL Statement Tagged to a Violation

```
reg [3:0] counter;
always @ (posedge clk) begin
  if (counter == 4'b1111 )
    counter <=4'b0;
  else
    counter <= counter + 1; // <- A
end
```

TABLE 5

| Example feature table for patterns within an RTL statement. | | | | | | |
|---|---|---|---|---|---|---|
| Feature Index | 0 | 1 | 2 | 3 | 4 | . . . |
| Feature Pattern | Zero padding | Potential header file | Open port connection | Similar signal naming patterns | Counter type assignment | . . . |
| Value for Listing 5 | 0 | 0 | 0 | 0 | 1 | . . . |

In this example, the static analysis flags a violation for RTL statement (A), because it is a statement where overflow can happen during assignment, due to a width mismatch. The user may waive these violations, because there is no potential overflow due to the counter type pattern. The waiver engine can identify these counter type assignments patterns. If the machine learning model has already been trained to waive these violations for counter type assignments, the waiver engine can also recommend waivers for other violations, which are related to counter type assignments. Therefore, these RTL patterns are used as features for violations (feature index 4 in Table 5).

In addition to the counter type assignment pattern, the following are some other features based on patterns within RTL statements.

Zero padding (feature index 0)—Concatenated RTL expressions with leading zero values.

Potential header file—Macro, parameter definitions, included in common RTL file.

Open port connection—RTL instantiations with deliberately unconnected ports.

Similar signal naming patterns—signals names stars with similar prefix.

Struct/interface signal usage—RTL expressions with struct/interface signals.

Using features from the RTL and violation fields, the waiver engine creates the final feature embeddings, for example as shown in Table 6 below.

TABLE 6

| Example feature embedding for violations | | | | | | | | |
|---|---|---|---|---|---|---|---|---|
| Violations | F1 | F2 | . . . | FK | FK + 1 | FK + 2 | . . . | FN |
| V1 | 1 | 0 | . . . | 0 | 1 | 5 | . . . | 0 |
| V2 | 2 | 5 | . . . | 1 | 4 | 3 | . . . | 3 |
| . . . | . . . | . . . | . . . | . . . | . . . | . . . | . . . | . . . |
| Vm | 1 | 3 | . . . | 5 | 7 | 1 | . . . | 0 |

In Table 6, each row represents a different violation, and the values $F_1$-$F_N$ is the embedding of that violation. Features $F_1$-$F_K$ are used to represent the RTL features (including both position features and pattern features), and features $F_{K+1}$ through $F_N$ are used to represent the violations features. The values do not have to be binary. They may take on different values, including string values. Both the open violations and the prior violations is embedded using the same set of features.

The waiver engine uses supervised classifiers available in machine learning based on a feature similarity approach. For example, the waiver engine uses K-Nearest Neighbor (KNN) machine learning techniques to match and cluster existing open violations 230 with previously considered violations 257. The open violations are contained in the violations database. They represent new unanalyzed violations that are reported by static analysis tools. In KNN, the waiver engine determines a list of nearest neighbors (closest according to a distance measure) of open violations related to previously waived violations. The waiver engine generates an output representing a set of violations which can be waived based on learned patterns from previously waived violations.

After identifying violations which can be waived, the waiver engine can group violations according to different patterns. Those groups are labeled with example waivers from the training set to convey information related to identified patterns to the users. According to an embodiment, the waiver engine processes the KNN model by determining the K number of nearest neighbors to previously waived violations. The waiver engine groups these violations into clusters (at 267 of FIG. 2) and attaches previously waived violations 257 to clusters for clarification.

These results may be presented to the user in the form of a report or a user interface. The user can review the groups of waivable violations recommended by the machine learning model. If the user wants to waive a group of violations, the waiver engine can auto generate the corresponding waiver commands. The automation helps verification teams to process the violations more efficiently within a shorter period of time.

Consider an example where there are three already waived violations W1-W3 (stored as 257 of FIG. 2) and eight open violations V1-V8 (stored as 230 of FIG. 2) as shown in Tables 7A and 7B below.

TABLE 7A

| Example of waived violations and some features | | | |
|---|---|---|---|
| waived violation | IP block | File | . . . |
| W1 | cmc_ip | data.v | . . . |
| W2 | counter | h_mem.v | . . . |
| W3 | cmob | tmux.v | . . . |

TABLE 7B

| Example of open violations and some features | | | |
|---|---|---|---|
| violation | IP block | File | . . . |
| V1 | dflop | h_mem.v | . . . |
| V2 | counter | h_mem.v | . . . |
| V3 | cmob | rnum.v | . . . |
| V4 | citer | ginfo.vh | . . . |
| V5 | comp | h_mem.v | . . . |
| V6 | cmc_ip | conn.v | . . . |
| V7 | ktimer | xser.v | . . . |
| V8 | cmc_ip | and.v | . . . |

In this example, waived violation W1 is reported for the IP block 'cmc_ip'. On the open violation list, violations V6 and V8 belong to the same IP block. Therefore, they are grouped with W1. Similarly, open violations V1, V2 and V5 are grouped with waived violation W2, because they are close in feature space because they have the same file name feature (h_mem.v).

Figure 3:
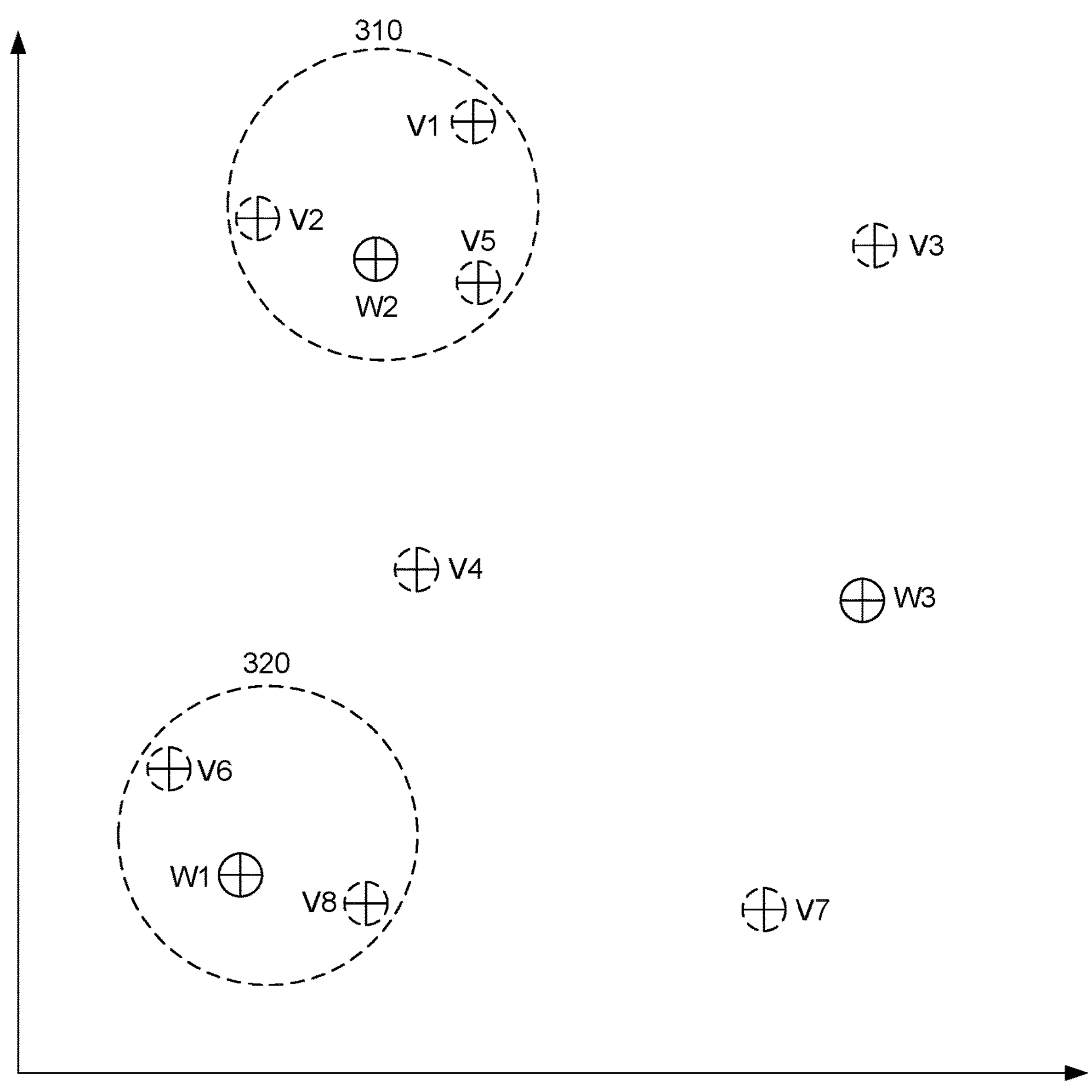
FIG. 3 illustrates classification of violations using a nearest neighbor machine learning model according to embodiments of the present disclosure.

FIG. 3 illustrates this classification of violations using a nearest neighbor machine learning model. The two axes in FIG. 3 represent the feature space for violations. In FIGS. 3, W1, W2, and W3 are already waived violations. V1, V2, V3, . . . . V8 are open violations. Using KNN, the waiver engine determines nearest open violations to already waived violations. The waiver engine performs grouping based on the determined nearest open violations. These grouping are indicated by the dashed circles 310, 320. After the model is trained with the extracted features from the known waivers, the waiver engine can predict whether new violations are similar to previously waived violations.

Figure 4:
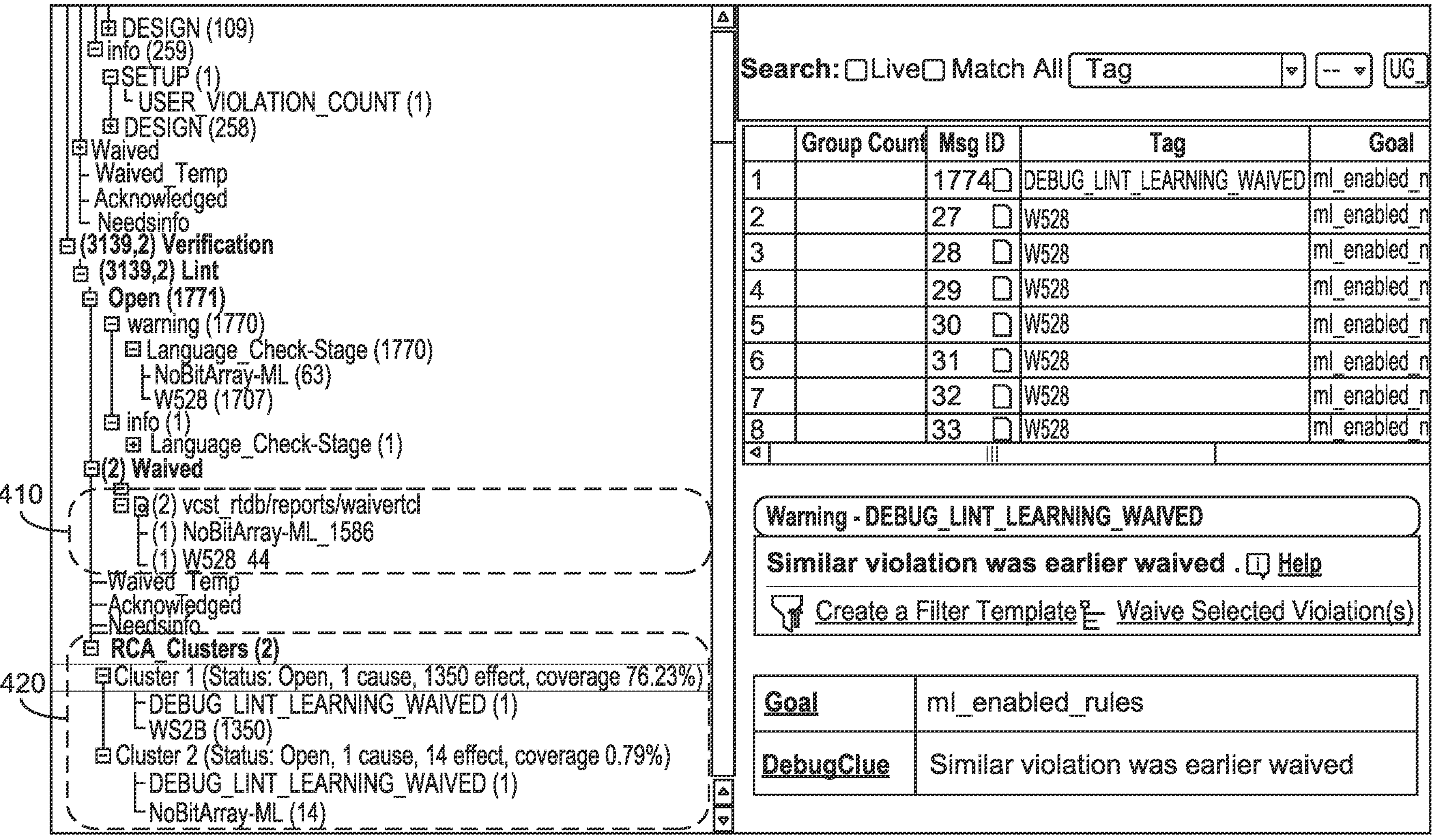
FIG. 4 is a screen shot of a graphical user interface for displaying waiver recommendations according to embodiments of the present disclosure.

FIG. 4 shows a screen shot of a graphical user interface for displaying waiver recommendations generated by the waiver engine according to an embodiment. As shown in FIG. 4, there are two previously waived violations from two example rules (named 'NoBitArray-ML' and 'W528'). These are in box 410. These are exemplary rule names based on violation types reported by static analysis tools. Other names can be used instead. According to their features, there are 14 and 1350 similar violations respectively grouped under 'RCA_Clusters'. These are in box 420. These clustered violations can also be waived similar to previously waived violations.

Figure 5:
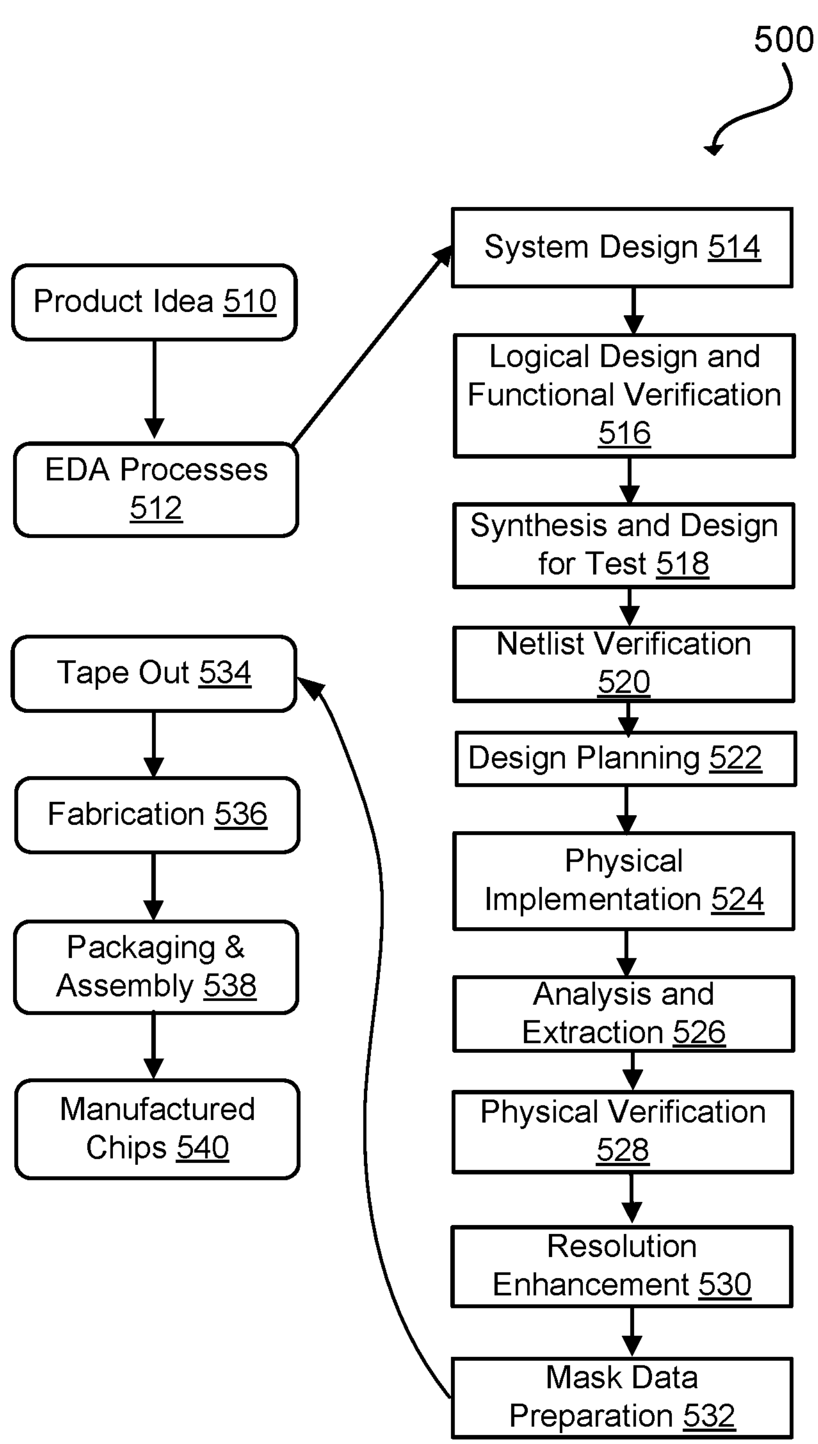
FIG. 5 depicts a flowchart of various processes used during the design and manufacture of an integrated circuit in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' The technologies described above may be used for logical design and functional verification 516, for example.

These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 5. The processes described by be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

accessing a design database containing register transfer level (RTL) code for a design;

accessing a violations database containing violations generated by a static analysis of the RTL code, wherein the violations are tagged to code snippets of the RTL code; and generating, by a machine learning model executing on a processing device, recommendations for waivers of the violations, based on the violations and the corresponding tagged code snippets; wherein the machine learning model was trained using a training set of samples, each sample comprising a sample code snippet of RTL code.

2. The method of claim 1, wherein generating recommendations for waivers of the violations comprises:

converting the code snippets tagged by the violations to embeddings based on features of the code snippets; and applying the embeddings as inputs to the machine learning model.

3. The method of claim 2, wherein the features include neighboring RTL constructs to the code snippet, and patterns within the code snippet.

4. The method of claim 1, wherein generating recommendations for waivers of the violations comprises:

converting the violations to embeddings based on features of the violations; and applying the embeddings as inputs to the machine learning model.

5. The method of claim 4, wherein the features include a location of the violation within the RTL code, and a type of the violation.

6. The method of claim 1, wherein generating recommendations for waivers of the violations comprises:

the machine learning model producing embeddings of waiver recommendations; and for embeddings that recommend waivers, converting the embeddings to waiver commands that implement the recommended waivers.

7. The method of claim 1, wherein generating recommendations for waivers comprises indicating whether violations should or should not be waived.

8. The method of claim 1, wherein the recommendations for waivers include a confidence level score for the recommendations.

9. A system comprising:

a memory storing instructions; and a processing device, coupled with the memory and to execute the instructions, the instructions when executed cause the processing device to:

execute a machine learning model that generates recommendations for waivers of violations; wherein the violations were generated by a static analysis of register transfer level (RTL) code for a design, the violations are tagged to code snippets of the RTL code, and the recommendations are generated by the machine learning model based on the violations and the tagged code snippets; and wherein the machine learning model was trained using a training set of samples, each sample comprising a sample code snippet of register transfer level (RTL) code; and automatically take actions to implement the recommended waivers.

10. The system of claim 9, wherein automatically taking actions to implement the recommended waivers comprises: automatically generating waiver commands that implement the recommended waivers.

11. The system of claim 10, wherein the waiver commands include waiver commands that waiver multiple violations.

12. The system of claim 10, automatically taking actions to implement the recommended waivers further comprises: automatically inserting the waiver commands in-line in the RTL code for the design.

13. The system of claim 9, wherein the instructions when executed further cause the processing device to:

form clusters of violations for which waivers are recommended; and present the recommended waivers for the clusters of violations.

14. The system of claim 9, wherein automatically taking actions to implement the recommended waivers further comprises: grouping violations; and generating waiver commands for groups of violations.

15. The system of claim 9, wherein automatically taking actions to implement the recommended waivers further comprises: grouping violations with previously waived violations; and generating waiver commands for groups of violations based on waivers for the previously waived violations.

16. A non-transitory computer readable medium comprising stored instructions, which when executed by a processing device, cause the processing device to:

access a design database containing register transfer level (RTL) code for a current design;

access a violations database containing violations generated by a static analysis of the RTL code, wherein the violations are tagged to code snippets of the RTL code; and generate, by a machine learning model executing on a processing device, recommendations for waivers of the violations, based on the violations and the corresponding tagged code snippets; wherein the machine learning model was trained using a training set of samples, each sample comprising a code snippet of register transfer level (RTL) code, a violation for that code snippet generated by a static analysis of the RTL code, and waiver information applicable to the violation.

17. The non-transitory computer readable medium of claim 16, wherein the samples in the training set are taken from RTL code for a design that is different than the current design.

18. The non-transitory computer readable medium of claim 16, wherein the samples in the training set are taken from RTL code for an earlier version of the current design.

19. The non-transitory computer readable medium of claim 16, wherein for some samples, the waiver information indicates that violations for those samples are waived, and, for other samples, the waiver information indicates that violations for those samples are not waived.

20. The non-transitory computer readable medium of claim 16, wherein the machine learning model comprises a K-nearest neighbor machine learning model.

* * * * *